United States Patent Office 2,980,670
Patented Apr. 18, 1961

2,980,670

FLUORINATED CORTICOSTEROIDS

Rudolph G. Berg, New London, and Gerald D. Laubach, Niantic, Conn., assignors to Chas. Pfizer & Co., Inc., Brooklyn, N.Y., a corporation of Delaware No Drawing. Filed Nov. 2, 1959, Ser. No. 850,031

6 Claims. (Cl. 260—239.55)

The present invention relates to steroid compounds and is more particularly concerned with 16β-fluorinated corticosteroids and 21-esters thereof, to novel intermediates in the production thereof and a process for the production of the novel compounds and the novel intermediates.

This application is a continuation-in-part of our earlier filed copending United States patent application Serial Number 801,004, filed March 23, 1959. Prior to this invention, 16-fluorinated corticosteroids and methods for the preparation thereof via (1) the reaction of the appropriate 16α,17α-oxido compound with hydrogen fluoride and (2) the reaction of a suitable 16β-bromo 21-acetate with silver fluoride have been reported. However, these preparatory methods produce poor yields of a generally ill-defined product.

It has now been found that a fluoro atom can be easily and economically introduced into the 16β-position of the steroid molecule to give 16β-fluorinated steroids which possess the complete corticosteroid side chain. The essential feature of the process of this invention resides in protecting the corticosteroid side chain of, for example, a 16β-bromo corticosteroid by conversion to the 17,20;20,21-bismethylenedioxy derivative. The thus protected compound is then reacted with silver fluoride to give the corresponding 16β-fluorinated corticosteroid-17, 20;20,21-bismethylenedioxy derivative from which the bis-methylenedioxy function can easily be removed as is described in our copending and concurrently filed patent applications Serial Nos. 850,032; 850,039 and 850,108. In these applications we describe 16β-fluorinated corticosteroids; 6α,16β-difluorinated corticosteroids and 6α-methyl-16β-fluorinated corticosteroids, respectively.

Compounds of the character described in the present application possess valuable anti-inflammatory, antirheumatoid arthritic and glucocorticoid activities to a remarkable degree. The 16β-fluorinated corticosteroids of this invention have been found to possess these valuable therapeutic activities to a much higher degree than the heretofore available 16-halogenated corticosteroids.

These compounds are also useful in the treatment of inflammatory conditions of the skin, ears and eyes of humans and of valuable domestic animals as well as contact dermatitis and other allergic reactions. Compositions containing the valuable compounds of the present invention can be prepared for administration to humans or animals in conventional dosage forms, such as, pills, tablets, capsules, solutions, elixirs or syrups for oral use, or in liquid forms which are adaptable to the natural and synthetic cortical steroid hormones for injectable products. The novel steroids can also be administered topically in the form of ointments, creams, and the like.

The novel compounds of the present invention may be illustrated by the generic formula:

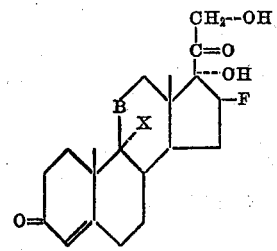

and the Δ¹-dehydro-analogs thereof wherein X is selected from the group consisting of fluorine, and chlorine; B is selected from the group consisting of carbonyl and β-hydroxymethylene; the 17,20;20,21-bismethylenedioxy derivatives thereof, and the 21-acylates thereof wherein the acyl radical is that of a hydrocarbon carboxylic acid containing from one to eight carbon atoms, inclusive.

The process of the present invention is illustrated by the following reaction sequence wherein the various symbols have the same significance as above:

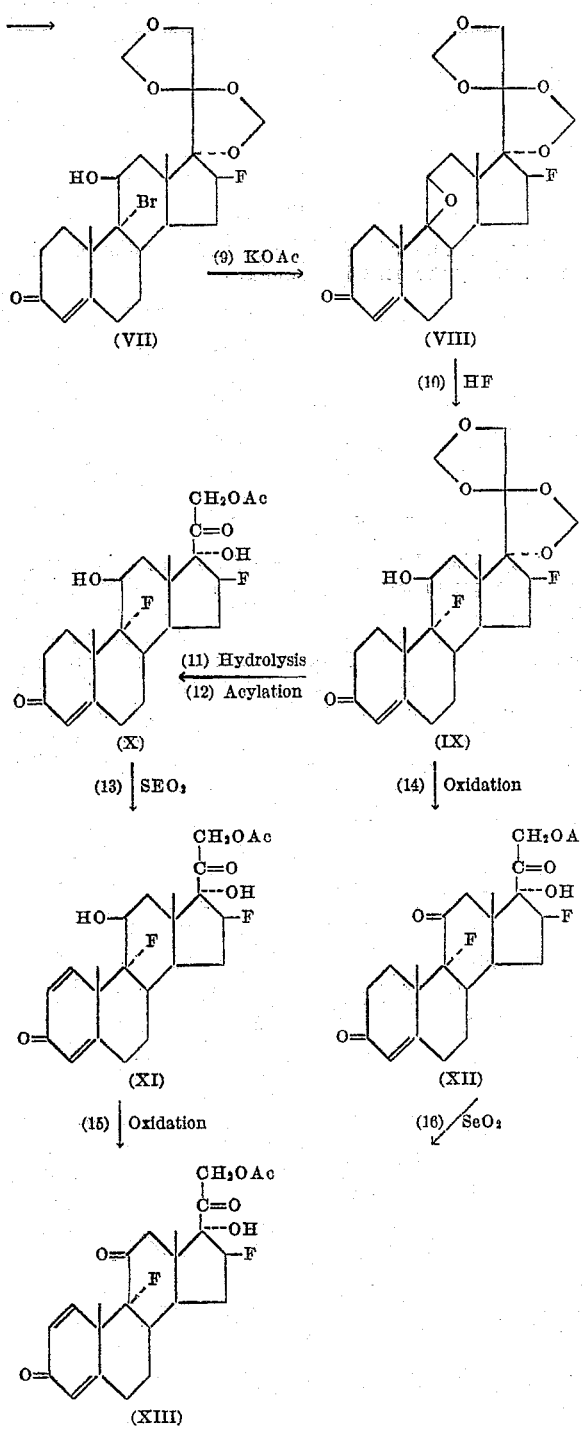

The process of the present invention may be practiced in general by microbiological hydroxylation of a 16α,17α-oxido-desoxycorticosterone (I) at the 11-position to produce the corresponding 11-hydroxyl derivative which is reacylated to the 21-ester (II). Dehydration of the said 11-hydroxylated derivative of the 16α,17α-desoxycorticosterone at the 9,11-positions produces the corresponding 16α,17α-oxido-Δ$^{4,9(11)}$-pregnadiene derivative (III). Cleavage of the epoxide ring of the thus produced 16α,17α-oxido-Δ$^{4,9(11)}$-pregnadiene with a halogenating agent, other than a fluorinating agent, such as, hydrogen chloride, hydrogen bromide or hydrogen iodide in gaseous or solution form, or a metal halide, other than a metal fluoride, which releases hydrogen halide when treated with acids produces the corresponding halohydrin acylate (IV). Acid hydrolysis of the thus produced bromohydrin acylate gives the corresponding 21-alcohol which on treatment with formaldehyde-hydrogen halide produces the corresponding 16β-bromo-17,20;20,21-bismethylenedioxy compound (V). Reaction of the thus produced 16β-bromo-17,20;20,21-bismethylenedioxy compound with silver fluoride yields the corresponding 16β-fluoro - 17,20;20,21 - bismethylenedioxy derivatives (VI) which on treatment with a hypohalogenating agent produces the corresponding 9α-halo-16β-fluoro hydrocortisone - 17,20;20,21 - bismethylenedioxy compound (VII). The said halohydrin is then treated with an alkali acetate to produce the 9β,11β-epoxide (VIII) which is treated with a halogenating agent, other of course, than one corresponding to the halogen of the halohydrin (VII) to give the dihalo-compound (IX). Removal of the 17,20;20,21-bismethylenedioxy function of the dihalo compound in acid media followed by acylation gives the corresponding 21-acylate of 9α-halo-16β-fluoro-hydrocortisone (X). Dehydrogenation of the said 21-acylate produces the corresponding 9α-halo-16β-fluoro-prednisolone acylate (XI) which is then oxidized to the corresponding 9α-halo-16β-fluoro-prednisone acylate (XIII). Alternatively, the said 21-acylate of 9α-halo-16β-fluoro-hydrocortisone (X) can be oxidized to the corresponding cortisone derivative (XII) and thence dehydrogenated to the 9α-halo-16β-fluoro-prednisone (XIII).

It is an object of this present invention to provide novel 16β-fluorinated corticosteroids. A further object of this invention is to provide novel intermediates of the 16β-fluorinated corticosteroids of the instant invention. Another object of the present invention is to provide novel 9α-halogenated-16β-fluorinated - 17α,21 - dihydroxy - 3,20-diketo steroids. Still another object of the present invention is to provide a process for the production of these novel 16β-fluorinated corticosteroids. Other objects will be apparent to those skilled in the art to which this invention pertains.

Also included within the purview of this invention are modifications of the illustrated process which comprise using as starting material a compound obtainable as an intermediate product at any stage of the process and carrying out the remaining process steps. The order of the various steps can be varied considerably as will be recognized by those skilled in the art. For example, 11β-hydroxylation or 11α-hydroxylation may be performed as the first step of the process; Δ$^1$-dehydrogenation may be carried out by chemical or microbiological means; removal of the bismethylenedioxy function may be accomplished following the dehydrogenation step; oxidation of the 11-hydroxyl group to a keto group may be performed before or after dehydrogenation.

In carrying out the process of the present invention the 16α,17α-oxidodesoxycorticosterone 21-acetate (I) is converted to the corresponding 11-hydroxyl derivative by microbiological oxidation. Depending upon the particular microorganism used, an 11β-hydroxyl or an 11α-hydroxyl group can be introduced into the steroid molecule. In the preferred embodiment of this invention, the 16α,17α-oxido-desoxycorticosterone 21-acetate is contacted with the oxygenating activity of an organism of the genus Pestolatia in an aqueous nutrient medium as described by Shull et al., in U.S. Patent 2,721,163 to produce the corresponding 16α,17α-oxido-11-epicorticosterone (II). The product is then reacetylated in accordance with known procedures to replace the acyl group removed during fermentation. The 21-acetate of 16α,17α-oxido-11-epicorticosterone thus obtained is dehydrated at the 9,11-positions via formation of the 11α-tosylate or mesylate followed by decomposition in a suitable organic solvent. In the preferred embodiment of this invention, a chloroform-pyridine solution of 16α,17α-oxido-11-epicorticosterone 21-acetate is treated with a chloroform solution of 16α,17α-oxido-11-epicorticosterone 21-acetate is treated with a chloroform solution of methanesulfonyl chloride at about 0° C. After 15 to 20 hours at 0° C. to 10° C., ice is added and the 11α-mesylate recovered from the mixture with chloroform. Removal of the chloroform under reduced pressure yields a syrup of the crude 11α-mesylate. This crude material is refluxed with a pyridine base, preferably 2-picoline and preferably in the presence of calcium carbonate for several minutes to several hours. The cooled solution is treated with a water-immiscible solvent, washed with dilute hydrochloric or nitric acid, the organic solvent concentrated and the residue crystallized from aqueous methanol giving the product 16α,17α-oxido-$\Delta^{4,9(11)}$-pregnadiene-21-ol-3,20-dione 21-acetate (III).

The thus-produced 16α,17α-oxido compound is converted to the halohydrin by treatment with a halogenating agent, such as, hydrogen chloride, hydrogen bromide, hydrogen iodide. In the preferred embodiment of this invention, the 16α,17α-oxido-$\Delta^{4,9(11)}$-pregnadiene-21-ol-3,20-dione 21-acetate is dissolved in acetic acid and treated at about room temperature with a solution of about 30 to 40 percent hydrobromic acid in acetic acid. The reaction time is generally between 5 minutes and 4 hours, after which the reaction product is recovered in conventional manner, as, for example, by adding water to the reaction mixture to precipitate 16β-bromo-$\Delta^{4,9(11)}$-pregnadiene-17α,21-diol-3,20-dione-21-acetate (IV).

The 21-acetoxy-halohydrin thus produced is hydrolyzed under mild acid conditions at about room temperature. The reaction time is generally from a few hours to up to 3 days depending upon the particular compound.

In the preferred embodiment of this invention, the said 21-acetoxy-halohydrin is dissolved in chloroform and methanol and hydrolyzed with hydrochloric acid of 20 to 37% concentration. The resulting 16β-bromo-$\Delta^{4,9(11)}$-pregnadiene-17α,21-diol-3,20-dione is isolated from the hydrolysis mixture by evaporation under reduced pressure with simultaneous addition of water and purified if desirable by recrystallization from a suitable organic solvent.

The thus-produced 21-hydroxy halohydrin is combined with formaldehyde-hydrogen chloride or formaldehyde hydrogen-bromide at room temperature to produce the corresponding 17,20;20,21-bismethylenedioxy derivative of the side chain. The reaction time is generally from 4 to 72 hours depending upon the compound being treated. Polymers of formaldehyde can also be used in place of aqueous formaldehyde but the formaldehyde-hydrogen chloride is the preferred reagent. In the preferred embodiment of this invention, a methylene chloride solution of the said halohydrin is treated with equal volumes of 37% aqueous formaldehyde and of 37% hydrochloric acid and the two phase system rapidly stirred at reflux temperature for several hours, generally, from 10 to 48 hours. The methylene chloride which may gradually distill off during this period may be replaced by about 4 to 6 volumes of hexane. The 17,20;20,21-bismethylenedioxy derivative of the 16β-bromo compound is then isolated by separating the two liquid phases, extracting the aqueous layer with a suitable organic solvent and washing the combined organic solutions successively with four portions of water in the proportions of about 1 to 2 volumes of water per volume of organic solution. The hexane solution is then dried with anhydrous magnesium sulfate or other suitable drying agent, filtered and evaporated under reduced pressure to give the crude 17,20;20,21-bismethylenedioxy derivative of 16β-bromo-$\Delta^{4,9(11)}$-pregnadiene-17α,21-diol-3,20-dione (V). Purification is accomplished by recrystallization from a suitable organic solvent system, such as, methylene chloride-methanol or ether.

The 16β-bromo-17,20;20,21-bismethylenedioxy derivative thus obtained is converted to the 16β-fluorinated derivative by treatment with dry silver fluoride in anhydrous isopropyl alcohol for about 2 to 3 hours at reflux in an inert atmosphere. The 16α-fluoro-17,20;20,21-bismethylenedioxy derivative is isolated by filtration of the insolubles followed by extraction with methylene chloride. Excess silver fluoride is extracted with water. The methylene chloride solution is dried and the crude 17,20; 20,21-bismethylenedioxy derivative of 16β-fluoro-$\Delta^{4,9(11)}$-pregnadiene-17α,21-diol-3,20-dione (VI) recrystallized from dimethylformamide-water.

In carrying out the process of the present invention to produce the 9α-halo-11β-hydroxy derivative (VII), the $\Delta^{4,9(11)}$-steroid is dissolved in an inert organic solvent, such as, dioxane, and reacted with a hypohalous acid, such as, hypobromous or hypochlorous acid, or with a hypohalous acid releasing agent in the presence of an acid. Such hypohalous releasing agents include N-bromoacetamide, N-chloroacetamide, N-bromo-succinimide, N-iodosuccinimide, and N-chlorosuccinimide. Such agents permit the formation of a hypohalous acid in situ when treated with aqueous sulfuric acid, perchloric acid, and the like. The reaction is generally conducted at about room temperature using from equimolar up to 25% excess of hypohalous acid releasing agent. At the completion of reaction, generally not over 2 hours, the excess of hypohalous acid is destroyed by the addition of sodium sulfite or hyposulfite. The 9α-halo-11β-hydroxy derivative thus produced is isolated by the addition of water followed by filtration of the precipitated product or extraction with an organic solvent. Purification is accomplished by recrystallization from a suitable organic solvent such as acetone. In the preferred embodiment of this invention the $\Delta^{4,9(11)}$-pregnadiene derivative is dissolved in dioxane and perchloric acid solution at room temperature, and treated with solid N-bromoacetamide. The reaction mixture is protected from light and, after 1 hour, the excess perchloric acid is destroyed by the addition of aqueous sodium sulfite. The 9α-bromo-16β-fluoro-hydrocortisone-17,20;20,21-bismethylenedioxy derivative (VII) is isolated as described above and purified by recrystallization from acetone. The said halohydrin is then converted to the 9β,11β-oxide derivative (VIII) by treatment with sodium or potassium acetate at reflux temperature for 0.5 to 2.0 hours. The epoxide is recovered by the addition of water followed by evaporation of the alcohol under reduced pressure and extraction of the aqueous solution with chloroform. The product is purified by recrystallization from a suitable organic solvent, such as, acetone.

Conversion of the 9β,11β-oxide to a halohydrin different from the foregoing halohydrin is accomplished by treatment with a halogenating agent, such as, hydrogen halide, in a suitable organic solvent. The halogenating agent used may be the gaseous hydrogen halide, a concentrated aqueous solution, or a metal halide which releases hydrogen halide when treated with acids. The anhydrous hydrogen halides are generally preferred since they permit the use of temperatures ranging from 0° C. to 50° C. and relatively short reaction times. The product is recovered by neutralizing the excess hydrogen halide followed by extraction with water immiscible solvents, such as, methylene chloride and ethylene chloride. Evaporation of the organic solvent leaves the crude halohydrin which is purified by recrystallization from a suitable organic solvent.

In the formation of the 17,20;20,21-bismethylenedioxy derivative of 9α,16β-difluorohydrocortisone, the corresponding 9β,11β-epoxide (VIII) is reacted with hydrogen fluoride to open the epoxide ring and produce 9α,16β-difluorohydrocortisone - 17,20;20,21 - bismethylenedioxy derivative (IX). The epoxide-opening step can be performed under anhydrous or aqueous conditions in the presence or absence of a catalyst, e.g., boron trifluoride. Under anhydrous conditions temperatures between about minus forty and plus fifty degrees centigrade are generally employed, the preferred limits being between about zero and 25 degrees centigrade. If anhydrous conditions are difficult or inconvenient to maintain, the oxide-opening reaction can be performed under aqueous conditions.

Thus aqueous hydrofluoric acid is admixed with a solution of the epoxide in an organic solvent, such as, for example, methylene chloride, chloroform, benzene, ether, and the like for a period of up to five hours, with one-half to two hours being the preferred reaction time. Room temperature is normally employed, but temperatures of zero to the boiling point of the mixture are operative. In the preferred embodiment of this invention, anhydrous conditions are employed. Thus, anhydrous hydrogen fluoride is passed into a methylene chloride solution of the epoxide at 0° C. to 5° C. After about two hours, the product is recovered by evaporation of the solvent.

Acid hydrolysis of the thus produced difluoro derivative as described above produces $9\alpha,16\beta$-difluoro-hydrocortisone which is then acylated to the corresponding 21-ester (X).

In the oxidation of the $11\beta$-hydroxyl corticosteroid to the corresponding 11-keto compound, the $11\beta$-hydroxyl compound is dissolved in a suitable organic solvent and treated with an oxidizing agent, such as, chromic acid, for a relatively brief period, generally about 15 to 60 minutes. In the preferred embodiment of this invention, an acetic acid solution of chromic acid is added to a solution of $11\beta$-hydroxy compound in glacial acetic acid. After about a half-hour alcohol is added and the mixture concentrated to a syrup under reduced pressure. The desired 11-keto compound is isolated with chloroform and recrystallized from aqueous alcohol. Acid hydrolysis of the 21-acylate of the 11-keto compound produces $9\alpha,16\beta$-difluoro-cortisone (XII). Alternatively, the 17,20;20,21-bismethylenedioxy derivative of $9\alpha,16\beta$-difluoro-hydrocortisone may be oxidized in like manner to the 17,20;20,21-bismethylenedioxy derivative of $9\alpha,16\beta$-difluoro-cortisone and then hydrolyzed to $9\alpha,16\beta$-difluorocortisone.

Dehydrogenation of the $11\beta$-hydroxy compound (X) or of the 11-keto compound (XII) in the form of the 21-acetates is accomplished with excess selenium dioxide in a high boiling inert organic solvent, such as, phenetole, diethylene glycol diethylether, dibutyl Cellosolve, xylene, dioxane, and so forth. A tertiary organic base may be added to expedite reaction. In the preferred embodiment of this invention the steroid compound, dibutyl Cellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the product isolated by crystallization from a suitable organic solvent or by chromatography on various adsorbents.

The following examples are illustrative of the process and products of this invention. It should be remembered that these examples are given primarily by way of illustration and the invention in its broader aspects is not to be restricted to these examples.

EXAMPLE I

$16\alpha,17\alpha$-oxido-11-epicorticosterone $16\alpha,17\alpha$-oxido-desoxycorticosterone acetate is contacted with the oxygenating activity of an organism of the genus Pestolatia in aqueous nutrient medium in accordance with the procedure of Shull et al., U.S. Patent 2,721,163 to give $16\alpha,17\alpha$-oxido-11-epicorticosterone which is recrystallized from methyl isobutyl ketone to constant melting point: 214–216° C. (dec.) $[\alpha]^{24.5}$ (chloroform) 142.2°.

Analysis.—Calcd. for $C_{21}H_{28}O_5$: C, 69.97; H, 7.83. Found: C, 69.90; H, 7.77.

Acetylation with acetic anhydride in pyridine produces the corresponding 21-acetate which is crystallized from methylene chloride-isopropyl ether and then recrystallized from benzene: M.P. 172–174°.

Analysis.—Calcd. for $C_{23}H_{30}O_6$: C, 68.63; H, 7.51. Found: C, 68.32; H, 7.55.

EXAMPLE II

$16\alpha,17\alpha$-oxido-11-epicorticosterone-11$\alpha$-mesylate 21-acetate To a solution of 9.0 g. of $16\alpha,17\alpha$-oxido-11-epicorticosterone 21-monoacetate in 9 ml. pyridine and 40 ml. methylene chloride at 0° C. is added a solution of 7 ml. methanesulfonyl chloride in 7 ml. methylene chloride during about thirty minutes. The mixture is then allowed to stand in an ice bath for 16 hours. Some ice is then added and the heterogeneous mixture is stirred vigorously for about an hour still in the ice bath. The layers are separated and the aqueous layer is washed once with methylene chloride. The combined organic layers are washed with sufficient 10% aqueous sulfuric acid to extract the excess pyridine, then once with water and dried over magnesium sulfate. The dried solution is filtered and concentrated in vacuo at a maximum bath temperature of 35° C. The crude oil, which shows only one spot on a paper chromatogram, is used directly in the next step without further treatment.

EXAMPLE III

$16\alpha,17\alpha$-oxido-$\Delta^{4,9(11)}$-pregnadiene-21-ol-3,20-dione 21-acetate The crude concentrate from Example III is treated with 50 ml. dry 2-picoline and 5 g. calcium carbonate powder. The mixture is stirred under a nitrogen atmosphere and heated to reflux for 20 minutes. The mixture is cooled to room temperature, filtered to remove excess calcium carbonate and the filtrate treated with water and methylene chloride. Sufficient 2 N hydrochloric or nitric acid is added to extract all the picoline. The layers are separated, the organic layer washed two times with water, dried over magnesium sulfate in the presence of some activated carbon and is concentrated in vacuo. The last trace of methylene chloride is displaced with methanol and the product is crystallized from methanol-water. One recrystallization gives the pure product: M.P. 162.2–163.4° C. The infrared absorption curve is consistent for that of the expected product.

EXAMPLE IV

$16\beta$-bromo-$\Delta^{4,9(11)}$-pregnadiene-$17\alpha,21$-diol-3,20-dione 21-acetate To a solution of $16\alpha,17\alpha$-oxido-$\Delta^{4,9(11)}$-pregnadiene-21-ol-3,20-dione 21-acetate (2.6 g.) in glacial acetic acid (104 ml.) at 16–17° C. is added 30–32% hydrobromic acid in glacial acetic acid (5.2 ml.). After 10 minutes at 16–17° C., water (104 ml.) is added to precipitate the product which is filtered, washed and dried in a vacuum oven at 50–60° C.: 2.67 g.: M.P. 148° C. (dec.); one spot on paper chromatogram.

Analysis.—Calcd. for $C_{23}H_{29}BrO_5$: Br, 17.17. Found: Br, 17.05.

In like manner $16\beta$-chloro-$\Delta^{4,9(11)}$-pregnadiene-$17\alpha,21$-diol-3,20-dione-21-acetate is prepared substituting hydrochloric acid for hydrobromic acid.

EXAMPLE V

$16\beta$-bromo-$\Delta^{4,9(11)}$-pregnadiene-$17\alpha,21$-diol-3,20-dione To a mixture of methylene chloride (24 ml.), methanol (83 ml.), water (9.4 ml.) and concentrated (37%) hydrochloric acid (5.7 ml.) at room temperature is added $16\beta$-bromo-$\Delta^{4,9(11)}$-pregnadiene-$17\alpha,21$-diol-3,20-dione 21-acetate (2.5 g.). The resulting solution is stirred 16 hours at 35° C. The reaction mixture is then concentrated under reduced pressure at 30 to 35° C. with simultaneous addition of water. The crystalline product is filtered, washed thoroughly with water and dried quickly in a vacuum oven at 50–60° C.; 2.03 g., M.P. 120° C. (dec.). The infrared absorption curve is consistent with that of the expected product.

Analysis.—Calcd. for $C_{21}H_{27}BrO_4$: Br. 18.88. Found: Br, 19.12.

In like manner 16β-chloro-$\Delta^{4,9(11)}$-pregnadiene-17α,21-diol-3,20-dione is prepared.

EXAMPLE VI

*17,20;20,21-bismethylenedioxy derivative of 16β-bromo-$\Delta^{4,9(11)}$-pregnadiene-17α,21-diol-3,20-dione*

The product from Example V (1.49 g.) is vigorously stirred as a slurry with benzene (23 ml.), 37% aqueous formaldehyde (15 ml.) and concentrated (37%) hydrochloric acid (15 ml.). Solution is complete in about one hour at room temperature. Hexane (75 ml.) is added gradually over the next four hours. Stirring is continued for a total of 22 hours. Sufficient methylene chloride is added to dissolve the precipitated product and the layers are separated. The organic layer is washed three times with water, dried over anhydrous magnesium sulfate, filtered and concentrated under reduced pressure. The last of the volatile solvents are displaced with dimethylformamide. The product is then dissolved in a minimum quantity of dimethylformamide at 90–100° C. and the resulting hot solution is treated with enough boiling water to initiate crystallization. Crystallization is completed by cooling in an ice-water bath. The product is filtered, washed with 80% dimethylformamide, then water and dried to constant weight in a vacuum oven at 90–150° C.: 1.07 g., M.P. 22.4° C. (dec.). This product is sufficiently pure for use in the next step but may be recrystallized from dimethylformamide-water M.P. 225° C. (dec.). The infrared absorption curve is consistent with that reported for bismethylene-dioxy compounds in the literature.

Similarly, the 17,20;20,21-bismethylenedioxy derivative of 16β-chloro-$\Delta^{4,9(11)}$-pregnadiene-17α,21-diol-3,20-dione is prepared.

EXAMPLE VII

*17,20;20,21-bismethylenedioxy derivative of 16β-fluoro-$\Delta^{4,9(11)}$-pregnadiene-17α,21-diol-3,20-dione*

30 gms. of dried silver fluoride is added in portions to 10 gms. of 16β-bromo-$\Delta^{4,9(11)}$-pregnadiene-17α,21-diol-3,20-dione-17,20;20,21-bismethylenedioxy derivative in 500 ml. of refluxing anhydrous isopropyl alcohol at reflux under an inert atmosphere of nitrogen. The isopropyl alcohol is dried by distillation from aluminum isopropoxide. After two hours at reflux, the insoluble matter is filtered and the product extracted with methylene chloride. Excess silver fluoride is removed by water extraction. The dry solution is then concentrated and the residue recrystallized from dimethylformamide-water.

EXAMPLE VIII

*17,20;20,21-bismethylenedioxy derivative of 9α-bromo-16β-fluoro hydrocortisone*

Solid N-bromoacetamide (0.96 g.) is added dropwise with stirring to a suspension of 16β-fluoro-$\Delta^{4,9(11)}$-pregnadiene - 17α,21 - diol - 3,20 - dione - 17,20;20,21 - bismethylenedioxy derivative (2 g.) and 0.46 N perchloric acid (3 ml.) in peroxide-free dioxane (80 ml.) at room temperature over a period of about one hour. The reaction is protected from light during the addition and for an additional hour. A 10% aqueous sodium sulfite is added with stirring until K-starch paper no longer turns blue. Ice (50 g.) and chloroform (200 ml.) is added and the layers separated. The chloroform dioxane solution is washed with water, then concentrated to a syrup in vacuo at room temperature. The addition of acetone (175 ml.) to the syrup causes rapid crystallization. The mixture is chilled overnight, then filtered. Additional product is recovered from the filtrate by evaporation to dryness. Recrystallization from acetone gives the pure 17,20;20,21-bismethylenedioxy derivative of 9α-bromo-16β-fluoro-hydrocortisone.

EXAMPLE IX

*17,20;20,21-bismethylenedioxy derivative of 9β,11β-oxido-16β-fluro-$\Delta^4$-pregnene-17α,21-diol-3,20-dione*

A solution of 9α-bromo-16β-fluoro-17,20;20,21-bismethylenedioxy-hydrocortisone (2 g.) in dioxane is added to a solution of anhydrous potassium acetate (1.4 g.) in absolute alcohol (15 ml.) heated to near reflux temperature. The mixture is heated to reflux for about 45 minutes and then cooled rapidly. The product, the 17,20;20,21-bismethylenedioxy derivative of 9β,11β-oxido-16β-fluoro-$\Delta^4$- pregnene-17α,21-diol-3,20-dione is precipitated by the addition of ice-water and filtered. Concentration of the filtrate permits isolation of additional product. The same product is obtained when the corresponding 9α-chloro or 9α-fluoro derivative is employed as starting material.

EXAMPLE X

*17,20;20,21-bismethylenedioxy derivative of 9α,16β-difluoro-hydrocortisone*

Approximately 1.2 g. of anhydrous hydrogen fluoride is passed into a solution of the 17,20;20,21-bismethylenedioxy derivative of 9β,11β-oxido-16β-fluoro-$\Delta^4$-pregnene-17α,21-diol-3,20-dione (1 g.) in redistilled chloroform (20 ml.) contained in a polyethylene bottle at 0° C. The mixture becomes an intense red color and separates into two layers. After 1–5 hours at 0° C., the mixture is made weakly alkaline by the addition of sodium bicarbonate solution. The chloroform layer is separated and evaporated to dryness to give the crude 9α,16β-difluoro-hydrocortisone 17,20;20,21-bismethylenedioxy derivative. The product is recrystallized from ethyl acetate.

In like manner, the analogues 9α-chloro compound is prepared using hydrogen chloride as acylating agent.

EXAMPLE XI

*9α,16β-difluoro-hydrocortisone*

1 g. of the product of Example X is refluxed for 20 minutes in 60% formic acid (100 ml.). The solution is then cooled to 30° C. by the addition of ice and extracted several times with methylene chloride. The combined organic layers are extracted twice with water, dried, and concentrated under reduced pressure to a heavy oil. The oil is treated with 10 ml. methanol containing 0.1 g. sulfuric acid at 20°–25° C. for one hour. 25 ml. water are added and the mixture extracted repeatedly with methylene chloride. The combined organic layers are dried and evaporated to dryness in vacuo. The residue is crystallized from benzene. Acetylation of the 21-alcohol with acetic anhydride in pyridine produces the corresponding 21-acetate.

Similarly, hydrolysis of the 17,20;20,21-bismethylenedioxy derivative of 9α,16β-difluoro-cortisone produces 9α,16β-difluoro-cortisone, identical to the product of Example XII, and hydrolysis of the products of Examples X and XIII produces the corresponding 9α-fluoro and 9α-chloro-16β-fluoro derivatives of hydrocortisone and cortisone.

EXAMPLE XII

*9α,16β-difluoro-cortisone 21-acetate*

9α,16β-difluoro-hydrocortisone 21-acetate (0.5 g.) is oxidized in glacial acetic acid (20 ml.) with chromium trioxide (0.12 g.) for 45 minutes. Alcohol (5 ml.) is then added and the mixture concentrated to a syrup. The 9α,16β-difluoro-cortisone 21-acetate is isolated with chloroform and the chloroform residue recrystallized from 95% alcohol. Acid hydrolysis according to the procedure of Example V produces the 21-alcohol. In like manner, the products of Examples XI and XIII are oxidized to the corresponding 11-keto compounds:

9α-chloro-16β-fluoro-17,20;20,21-bismethylenedioxy-cortisone

9α,16β-difluoro-17,20;20,21-bismethylenedioxy-cortisone
9α,chloro-16β-fluoro-17,20;20,21-bismethylenedioxy-prednisone
9α,16β-difluoro - 17,20;20,21 - bismethylenedioxy prednisone
9α-chloro-16β-fluoro cortisone
9α,16β-difluoro-prednisone

EXAMPLE XIII

9α,16β-difluoro-prednisolone

A mixture of 9α,16β-difluoro hydrocortisone 21-acetate (0.5 g.), freshly sublimed selenium dioxide (0.5 g.) and 10 ml. of dibutyl Cellosolve is heated in a nitrogen atmosphere for about 10 hours at 175° C. The brown supernatant solution is decanted from the residual solid and cooled to room temperature. The addition of low boiling petroleum ether precipitates 9α,16β-difluoroprednisolone 21-acetate which is purified by chromatographic separation on a Florisil (synthetic magnesium silicate) column. Acid hydrolysis according to the procedure of Example V gives 9α,16β-difluoro-prednisolone.

In like manner, the $\Delta^1$-dihydro products of Examples X, XI and XII are converted to the corresponding $\Delta^1$-dehydro derivatives:

9α,16β-difluoro-prednisone
9α-chloro-16β-fluoro-17,20;20,21-bismethylenedioxy-prednisolone
9α,16β-difluoro - 17,20;20,21 - bismethylenedioxy - prednisolone
9α-chloro-16β-fluoro-prednisolone

EXAMPLE XIV

A variety of 21-esters of 9α,16β-difluoro-prednisolone, 9α,16β-difluoroprednisone, 9α,16β-difluoro-hydrocortisone and 9α,16β-difluoro-cortisone are prepared in accordance with conventional methods. These include such esters as the formate, the acetate, the propionate, the isobutyrate, the hexanoate, the octanoate, the benzoate and the succinate.

What is claimed is:

1. The 17,20;20,21-bismethylenedioxy derivative of 9α-bromo-16β-fluorohydrocortisone.
2. The 17,20;20,21-bismethylenedioxy derivative of 16β-fluoro-$\Delta^{4,9(11)}$-pregnadiene-17α,21-diol-3,20-dione.
3. The 17,20;20,21-bismethylenedioxy derivative of 16β-bromo-$\Delta^{4,9(11)}$-pregnadiene-17α,21-diol-3,20-dione.
4. The 17,20;20,21-bismethylenedioxy derivative of 9β,11β-oxido-16β-fluoro-$\Delta^4$-pregnene-17α,21-diol-3,20-dione.
5. The 17,20;20,21-bismethylenedioxy derivative of 9α,16β-difluoro-hydrocortisone.
6. The 17,20;20,21-bismethylenedioxy derivative of 9α,16β-difluoro-cortisone.

References Cited in the file of this patent
UNITED STATES PATENTS
2,915,434     Agnello et al.            Dec. 1, 1959

UNITED STATES PATENT OFFICE

CERTIFICATE OF CORRECTION

Patent No. 2,980,670                                   April 18, 1961

Rudolph G. Berg et al.

It is hereby certified that error appears in the above numbered patent requiring correction and that the said Letters Patent should read as corrected below.

Column 9, line 29, for "22.4° C." read -- 224° C. --.

Signed and sealed this 28th day of November 1961.

(SEAL)
Attest:

ERNEST W. SWIDER
Attesting Officer

DAVID L. LADD
Commissioner of Patents

USCOMM-DC